United States Patent
Reinemuth et al.

[11] Patent Number: 5,544,871
[45] Date of Patent: Aug. 13, 1996

[54] HOLDER FOR VIBRATION-DECOUPLED FASTENING OF A SUBSTANTIALLY FLAT MACHINE PART

[75] Inventors: Otto Reinemuth; Kurt Jäger, both of Weinheim, Germany

[73] Assignee: Firma Carl Freudenberg, Weinham, Germany

[21] Appl. No.: 459,876

[22] Filed: Jun. 2, 1995

Related U.S. Application Data

[63] Continuation of Ser. No. 268,421, Jun. 30, 1994, abandoned.

[30] Foreign Application Priority Data

Jul. 28, 1993 [DE] Germany .................... 43 25 250.8

[51] Int. Cl.$^6$ ........................................ F16F 3/04
[52] U.S. Cl. ................ 267/293; 267/153; 248/635
[58] Field of Search ................. 267/141, 141.1, 267/141.2, 141.3, 141.4, 141.6, 140.2, 140.5, 153, 293, 294; D8/356, 399; 411/531, 541, 544, 150; 284/634, 635, 638

[56] References Cited

U.S. PATENT DOCUMENTS

| | | | |
|---|---|---|---|
| 3,350,042 | 10/1967 | Stewart | 267/141.4 |
| 4,286,777 | 9/1981 | Brown | 248/635 |
| 4,711,135 | 12/1987 | Horiuchi | 284/635 |
| 5,139,244 | 8/1992 | Chakko | 267/293 |
| 5,286,014 | 2/1994 | Channo | 267/293 |
| 5,303,896 | 4/1994 | Sterka | 248/635 |
| 5,328,203 | 7/1994 | Baba | 280/728 A |
| 5,335,893 | 8/1994 | Opp | 248/635 |

*Primary Examiner*—Robert Oberleitner
*Assistant Examiner*—C. T. Bartz
*Attorney, Agent, or Firm*—Kenyon & Kenyon

[57] ABSTRACT

A holder for the vibration-decoupled fastening of a substantially flat machine part having at least one recess. The holder has a hollow cylindrical sleeve manufactured of a tough, preferably metallic, material which is surrounded radially on the outside—in a non-rotatable manner—by an elastomeric body. The body has an annular groove surrounding the sleeve, which groove has an axial size which corresponds substantially to the thickness of the machine part and a groove bottom which is adapted to the shape of the recess. The groove bottom and the limitation of the recess can be brought into engagement with each other under initial elastic stress.

9 Claims, 3 Drawing Sheets ns5,544,871

HOLDER FOR VIBRATION-DECOUPLED FASTENING OF A SUBSTANTIALLY FLAT MACHINE PART

This application is a continuation of application Ser. No. 08/268,421, filed on Jun. 30, 1994, now abandoned.

BACKGROUND OF THE INVENTION

Field of the Invention

The present invention relates to a holder for the vibration-decoupled fastening of a substantially flat machine part which has at least one recess. Such a holder is preferably used for fastening structural parts which can malfunction in response to impacts and/or induced vibrations. The structural part can be, for instance, an electronic control device or a control console for a computer-controlled machine tool. The holder is particularly useful for securing an air bag to a steering wheel in a motor vehicle.

SUMMARY OF THE INVENTION

The object of the present invention is to provide a holder which is simple and inexpensive to manufacture and provides excellent vibrational decoupling of the supported machine part from its support.

In order to achieve the objects of the present invention, the holder is made of a hollow cylindrical sleeve manufactured of a tough material which is surrounded on its outer side—in a radial direction—by an elastomeric body so that these parts are non-rotatable with respect to each other. The body has an annular groove surrounding the sleeve of an axial size which corresponds substantially to the thickness of the machine part to be held in the recess and a groove base adapted to the shape of the recess. The groove base and the limitation of the recess can be brought into engagement with each other under initial elastic stress. The machine element therefore can be fastened on a support in a vibration-decoupled manner regardless of the direction of the vibrations introduced. Depending on the frequency and the amplitude of vibration, the properties of the holder during use can be adjusted by suitable selection of the elastomeric material used and/or the value of the initial stresses in the radial and axial directions on the machine part. The initial axial stress of the holder on the surfaces of the machine part is of particular importance since good relative mobility must be assured in this area in order to isolate vibrations which are introduced in the radial direction.

In accordance with a first embodiment of the present invention, the elastomeric body can be manufactured in one piece. This construction is advantageous in that manufacture requires only a mold in which the elastomeric material is extruded around the sleeve. Subsequent machining of the holder can thus be dispensed with. After manufacture, the holder of the invention is a complete part ready for installation, and can be clipped into the recess.

In another embodiment, the elastomeric body can be made in three parts, the annular groove being delimited by a bushing which surrounds the sleeve and forms the groove base and by two disks in the form of circular rings. The disks and the sleeve which are attached to the bushing can be placed together in this embodiment. Mounting of the machine part on its support is considerably simplified by a such an embodiment. The bushing and one of the disks can be fastened as a preassembled unit in the recess of the machine part in a first assembling step. The second disk is then pushed onto the sleeve flange, which protrudes axially from the recess. The machine part, which is preassembled with the holder, is then positioned on a support and, for instance, screwed to it. The sleeve, which can consist of a non-creeping, preferably metallic material, limits the axial pressing together of the holder and the machine part, so that good relative movement of the machine part in the radial direction with respect to the sleeve is assured.

Depending of the circumstances of use, the sleeve and the disks can, in the case of a multipart design, be formed of materials having damping properties which differ from each other. The properties in use of the holder can then, for instance, by adapted to the existing circumstances merely by a change of the material of one or more of the parts, without it being necessary to change the geometrical dimensions of the holder. Holders which are adapted to the specific vibrational behavior can thereby be favorably produced at low cost in large numbers.

The groove base can have at least three elevations distributed uniformly around the circumference which extend radially in the direction towards the recess. During use of the holder, a radial prestressing of the bushing within the recess of the machine part is thereby reliably assured. Slight setting phenomena during use thus have no negative influence on the properties in use of the holder. Furthermore, by such a feature, the damping characteristics of the holder upon vibrations introduced in the radial direction can be substantially controlled.

The elevations can be designed, for instance, be sinusoidally shaped and can extend along the entire groove base. The rigidity of the holder in a radial direction can, with such a development, be controlled by the number of elevations in the circumferential direction and/or the size of the elevations in the radial direction.

In another embodiment, the elevations can be formed by eight cams arranged in the radial direction. In this embodiment, there is the advantage that due to the comparatively large number of cams which are distributed uniformly in the circumferential direction, a uniformly distributed spring rigidity is produced, regardless of the direction of the vibrations introduced in the radial direction. The spring rigidity is determined by the elastomeric material and the cross-section of the cams.

For complete decoupling of vibrations introduced radially into the holder, good relative mobility of the machine part in the radial direction with respect to the holder is necessary, so that decoupling of radially introduced vibrations is effected by the radial yieldability of the elastic material of the bushing. In order to favor such operating behavior, the elastomeric body can be provided, at least on the axial limiting surfaces of the groove which face each other, with a friction-reducing surface coating, which can be a PTFE foil adhesively bonded to the limiting surfaces. A surface coating of PTFE has the result that, regardless of the material of which the machine part consists, excellent properties in use of the holder with respect to the decoupling of vibrations is obtained over a long period of use. Furthermore, the handling of such a surface coating is greatly simplified as compared with a liquid or paste surface coating since it does not require maintenance of the holder during its entire useful life and/or a seal. The holder has consistent damping properties during its entire period of use.

In many cases, it has proven advantageous for the elastomeric body to have an axial rigidity which is 10 to 80, and preferably 40 to 60, times greater than the radial rigidity. Such a case of use is present, for instance, when oscillations are introduced radially into the holder and the machine part loads the bushing in the same direction by its own weight. If the holder of the present invention is used, for instance, to receive an air bag in the steering wheel of a motor vehicle, the limit conditions described above are present. Vibrations which are caused, for instance, by the nature of the surface of the road and are transmitted via the wheels and wheel suspension to the steering, and/or imbalances in at least one of the wheels and/or vibrations which are produced by the internal combustion engine can result in radial vibrations of the steering wheel. In order to prevent these vibrations from having a negative effect on the release electronics of the air bag, four of the holders in accordance with the present invention are used, for example. The vibration-decoupled holding of the air bag, which is developed as an impact pot and is itself of comparatively high weight, furthermore has the advantage that inherent vibrations of the structural part itself are reduced. Substantially vibration-free fastening of the air bag on the steering wheel by the holders in accordance with the invention is advantageous with respect to producing the smallest possible movement in the field of view of the driver, so that the driver can observe the road without his or her attention being diverted.

BRIEF DESCRIPTION OF THE DRAWINGS

Two embodiments of the holder in accordance with the present invention is explained in further detail with reference to the drawings, in which.

DETAILED DESCRIPTION OF THE DRAWINGS

Figure 1:
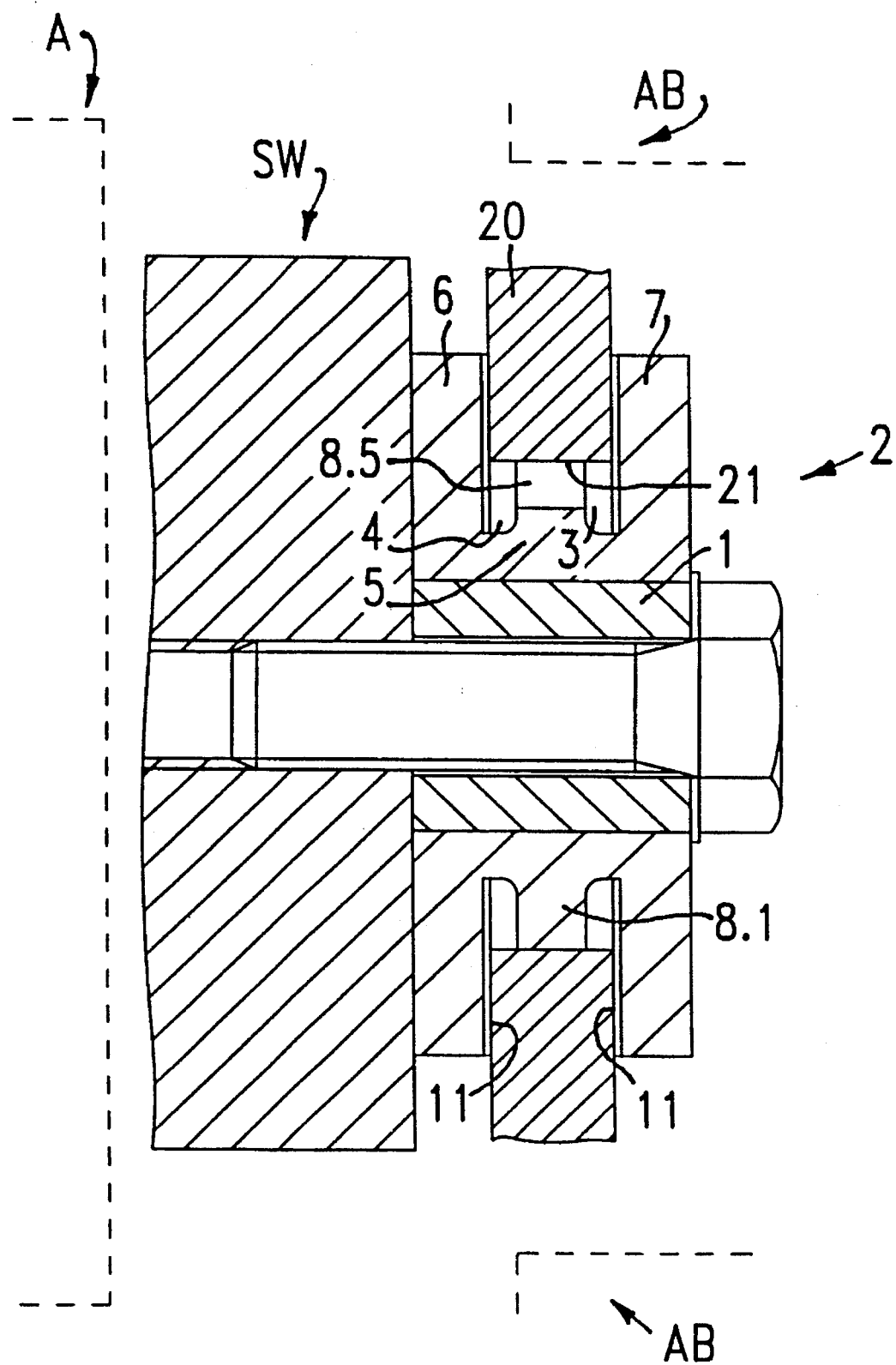
FIG. 1 shows a first embodiment of a holder constructed as a single part, the body being designed as one piece.

FIG. 1 shows a first embodiment of a holder which is used, for example, for the vibration-decoupled reception of an air bag AB on the steering wheel SW of a motor vehicle A. The holder includes a sleeve 1 manufactured of a metallic material which limits the axial pressing pressure and assures dependable fastening of the air-bag-holding plate. The sleeve is surrounded in the embodiment of FIG. 1 by an elastomeric body 2 which is formed in one piece. The body 2 is provided with an annular groove 3, the axial size of which corresponds essentially to the thickness of the holding plate 20 to be received, and which includes a groove base 4. In the embodiment of FIG. 1, a recess 21 in the holding plate 20 is formed by a bore with which the elevations 8.1, 8.2, . . . of the bushing 5 are in engagement under radial stress. The disk-shaped axial limitations 6, 7 of the body 2 are provided, on the inner sides facing each other which act as groove faces (as indicated by reference numerals 9, 10), with a friction-reducing surface coating in the form of a PTFE foil 11. The PTFE foil 11 allows good relative mobility in the radial direction for the holding plate 20 received in the annular groove 3. Excellent vibrational decoupling is obtained as a result of the above-described configuration. In the embodiment of FIG. 1, the elevations 8.1, 8.2, . . . are configured as cams and are distributed uniformly in a circumferential direction. The holder of the embodiment of FIG. 1 has a rigidity in the axial direction which is 50 times greater than its rigidity in the radial direction.

Figure 2:
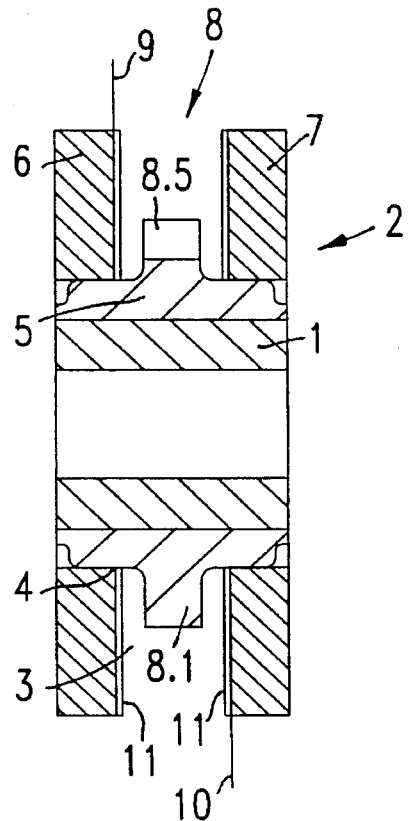
FIG. 2 shows a second embodiment of the holder of the invention in an assembly view, the body being designed in several parts.

FIG. 2 shows a second embodiment of the holder of the present invention which differs from the embodiment shown in FIG. 1 in that it is made of several parts. The holder consists of a sleeve 1 of metallic material which is surrounded on its circumference by a bushing 5 of the body 2 made of an elastomeric material. The bushing 5 and the sleeve 1 are vulcanized to each other. The holder is delimited on both sides in the axial direction by disks 6, 7, which are of identical configurations and each of which has a foil 11 of PTFE on an inner face which acts as a groove face. The advantage of the embodiment shown in FIG. 2 is in its simplified assembly. The sleeve 1, which forms a unit with the bushing 5, is preassembled with one of the disks 6 and placed in the recess in the machine part. Thereupon, the second disk 7 is pushed onto the projection which extends in radial direction over the recess so that the vibration-decoupled machine part can be mounted on a support plate.

Figure 3:
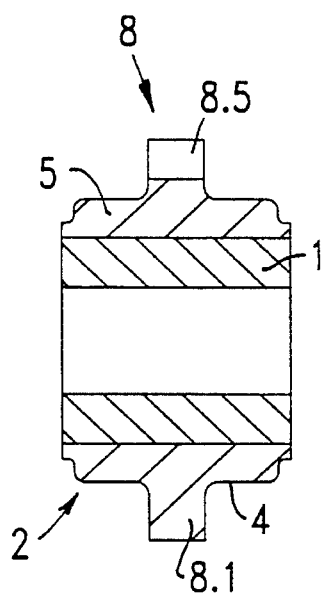
FIG. 3 shows the bushing and sleeve as single part in longitudinal cross section.
Figure 4:
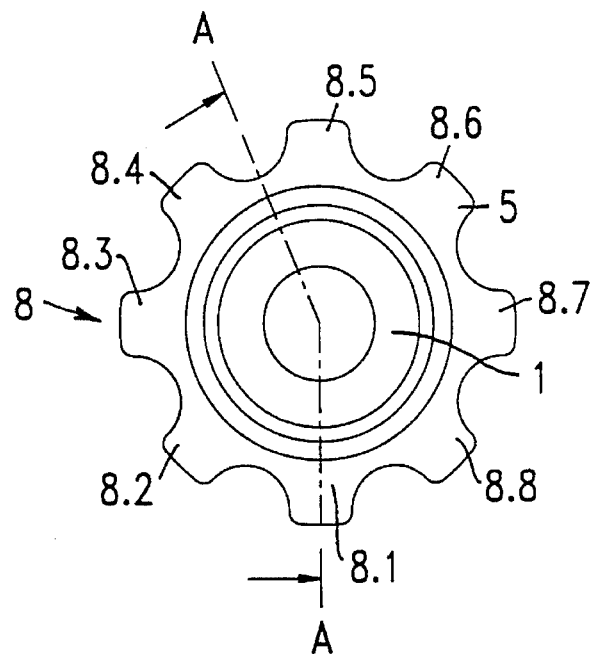
FIG. 4 is a front view of the unit shown in FIG. 3.

FIG. 3 shows the unit consisting of sleeve 1 and bushing 5 as an individual part seen in cross section along the section line A—A of FIG. 4. The sleeve 1 consists of a metallic material and is adhesively bonded or vulcanized to the elastomeric material of the bushing 5.

FIG. 4 is a side view of the unit shown in FIG. 3. The elevations 8.1 to 8.8 are cam shaped and extend in the radial direction.

Figure 5:
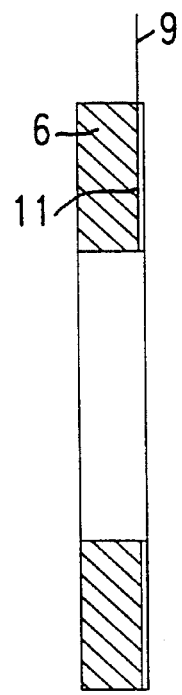
FIG. 5 shows one of the axial limitations of the holder of FIG. 2.

FIG. 5 shows the disk 6 of FIG. 2 as individual part. One of its axial limiting surfaces is coated with a PTFE foil 11 in order to assure good vibrational decoupling of the supported machine part. The disks 6, 7 shown in FIG. 2 are of identical design, which is of particular importance from a manufacturing standpoint and for economical manufacture of the holder.

We claim:

1. A holder for vibration-decoupled fastening of a substantially flat machine part, said machine part having a recess, said holder comprising:

a hollow cylindrical sleeve of a relatively rigid material; and an elastomeric body which surrounds said sleeve and is non-rotatable with respect to said sleeve, said elastomeric body comprising an annular groove surrounding said sleeve of an axial size corresponding substantially to a thickness of said machine part adjacent said groove, said elastomeric body further comprising a groove base adapted to a shape of said recess and defining a radial limitation of said groove and groove faces defining axial limitations of said groove, said groove base and said groove faces being shaped for engagement with said machine part under initial elastic stress, said elastomeric body comprising a friction-reducing surface coating on said groove face, wherein said elastomeric body is manufactured in one piece.

2. The holder of claim 1, wherein:

said groove base comprises at least three radially extending elevations distributed uniformly in a circumferential direction.

3. The holder of claim 2, wherein:

said elevations are sinusoidally shaped.

4. The holder of claim 2, wherein:

said elevations comprise eight cam-shaped elevations.

5. The holder of claim 1, wherein:

said elastomeric body has an axial rigidity which is 10 to 80 times greater than a radial rigidity of said elastomeric body.

6. The holder of claim 5, wherein:

said elastomeric body has an axial rigidity which is 40 to 60 times greater than a radial rigidity of said elastomeric body.

7. A holder for vibration-decoupled fastening of a substantially flat machine part, said machine part having a recess, said holder comprising:

a hollow cylindrical sleeve of a relatively rigid material; and an elastomeric body which surrounds said sleeve and is non-rotatable with respect to said sleeve, said elastomeric body comprising an annular groove surrounding said sleeve of an axial size corresponding substantially to a thickness of said machine part adjacent said groove, said elastomeric body further comprising a groove base adapted to a shape of said recess and defining a radial limitation of said groove and groove faces defining axial limitations of said groove, said groove base and said groove faces being shaped for engagement with said machine part under initial elastic stress, said elastomeric body comprising a friction-reducing surface coating on said groove face, wherein said elastomeric body is manufactured in three parts, said groove being defined by a bushing which surrounds said sleeve and which forms said groove base, said groove being further defined by two disks defining said groove faces.

8. The holder of claim 7, wherein:

said bushing and said disks are formed of materials of differing damping properties.

9. A holder for vibration-decoupled fastening of a substantially flat machine part, said machine part having a recess, said holder comprising:

a hollow cylindrical sleeve of a relatively rigid material; and an elastomeric body which surrounds said sleeve and is non-rotatable with respect to said sleeve, said elastomeric body comprising an annular groove surrounding said sleeve of an axial size corresponding substantially to a thickness of said machine part adjacent said groove, said elastomeric body further comprising a groove base adapted to a shape of said recess and defining a radial limitation of said groove and groove faces defining axial limitations of said groove, said groove base and said groove faces being shaped for engagement with said machine part under initial elastic stress, said elastomeric body comprising a friction-reducing surface coating on said groove faces, said surface coating comprising a PTFE foil adhesively attached to said groove faces.

\* \* \* \* \*